United States Patent [19]

Shimada

[11] Patent Number: 4,579,407
[45] Date of Patent: Apr. 1, 1986

[54] INTERFACE CABLE
[75] Inventor: Toshio Shimada, Kanagawa, Japan
[73] Assignee: Technopark Mine Co., Ltd., Tokyo, Japan
[21] Appl. No.: 648,141
[22] Filed: Sep. 7, 1984
[30] Foreign Application Priority Data Sep. 9, 1983 [JP] Japan .......................... 58-139984[U]

[51] Int. Cl.⁴ ...................... H01R 11/00; H01R 19/50
[52] U.S. Cl. .............................. 339/29 R; 339/147 R; 200/51.04
[58] Field of Search ...................... 339/28, 29 R, 29 B, 339/147 R, 147 P; 200/51.02, 51.03, 51.04

[56] References Cited
U.S. PATENT DOCUMENTS

| 2,443,960 | 6/1948 | O'Brien | 339/147 R |
| 2,484,092 | 10/1949 | Hopgood | 339/28 |
| 2,977,565 | 3/1961 | Uhlig | 339/147 P |
| 3,391,262 | 7/1968 | Twitchell, Jr. | 200/51.03 |
| 3,890,836 | 6/1975 | McKenzie et al. | 339/28 |
| 4,001,571 | 1/1977 | Martin | 339/28 |
| 4,163,134 | 7/1979 | Budrose | 339/29 B |
| 4,166,241 | 8/1979 | Grant | 339/29 B |
| 4,367,417 | 1/1983 | Casasanta | 339/29 R |
| 4,460,811 | 7/1984 | Murr et al. | 200/51.03 |

FOREIGN PATENT DOCUMENTS 2757967 7/1979 Fed. Rep. of Germany ... 339/147 R

OTHER PUBLICATIONS

EIA Standard for the RS-232-C Connector, Aug. 1969, published by the Electronic Industries Association (Engineering Department).

Primary Examiner—Gil Weidenfeld
Assistant Examiner—Gary F. Paumen
Attorney, Agent, or Firm—Cushman, Darby & Cushman

[57] ABSTRACT

An interface cable comprising a plurality of changeover switches for selectively connecting various lines of the interface cable. It is characterized in that the plurality of changeover switches are provided between RS232C connectors connected to the ends of the interface cable. The changeover switches can interchange an SD line and an RD line with respect to each other and can selectively connect an RS line, a CS line, a DR line, a CD line and an ER line between the RS232C connectors.

1 Claim, 10 Drawing Figures

INTERFACE CABLE

FIELD OF THE INVENTION

This invention relates to an interface cable, of the RS232C standard type interface, connected to a plurality of switches, and more particularly to a cable which can perform many kinds of cable connections merely by changing the positions of the switches. It should be understood that the term "RS232C interface" as used herein means one of the standard interfaces established in order to interconnect the respective units of data processors and corresponds to JIS (Japanese Industrial Standard) C 6361 and EIA (Electronics Industries Association) RS-232-C.

PRIOR ART

The RS232C standard sets forth a connecting interface between modem equipment (DCE) and terminal equipment (DET) and is not intended to interconnect modems to each other (DCE), nor terminal equipment to each other (DTE). However, since the RS232C standard is widely used as a standard interface connecting computers and peripheral devices thereof, this standard interface is used to interconnect a great variety of equipment and devices. For this purpose, however, there are many instances in which it is not practicable to apply an RS232C cable. Therefore, vendors such as, computer vendors, manufacture and sell various kinds of adaptors or exclusive cables which conform to their own computers in order to interface, for example, a digital signal in computer terminal equipment with an asychronous, or synchronous digital signal in a serial, or parallel data terminal equipment.

As the opportunities for using different computers and terminal equipment increase, a user is obliged to take the trouble to replace the connector of the connecting cables in order to obtain a proper connection between the equipment being used.

Although this method is inexpensive, the RS232C interface ports used for computers as well as peripheral equipment thereof are in almost all instances manufactured in accordance with a prefixed standard and therefore, physical and electrical standards are satisfied, but because of the differences of the method of use and of the interconnected equipment protocol, the types of connecting cables become considerably large in number depending on the standards of the equipments or devices to be connected. Accordingly, connecting cables are unable to connect a wide variety of equipmnent. Under the present circumstances, about 20 kinds of cables having different connecting lines are marketed. Because of the foregoing, when the connection must be replaced for new equipment, misuse or misconnection is likely to occur which often creates serious problems such as interference between signals.

The present inventor discovered that by equipping cables with switches, various types of connections can be made available.

SUMMARY OF THE INVENTION

The object of the present invention is to provide cables with switches, wherein the use of the cable with RS232C connectors for connecting a modem (DCE) and a terminal (DTE) can be selectively changed to connect other pieces of equipment merely by operating the switches.

The present invention is characterized in that a plurality of changeover switches are provided between the RS232C connectors connected at the ends of the connecting cable, which contains multiple lines therein, the switches being used for selectively changing the connection with respect to at least a part of the multiple lines. Particularly, it is useful that the SD line and RD line (BA and BB, respectively, for EIS RS-232-C); and are arranged to be interchangeable with respect to each other, and the RS line, CS line, DR line, CD line and ER line (CA, CB, CC, CF and CD, respectively, for EIS RS-232-C) are selectively connectable by switching. The present invention is further characterized in that various kinds of cable connections can be performed using only one cable.

According to the present invention, it is unnecessary to prepare different types of cables each time the necessity arises for interconnecting equipment and/or devices. Instead, it is adequate to prepare only one multi-line cable with switches. By selectively turning "on" or "off" each of the changeover switches, the modem (DCE) and the terminal equipment (DTE) can be connected in any combination. Furthermore, depending on the combination of "on" and "off" switches equipment of the same type can be connected to each other. Consequently, instead of producing many different kinds of cables in small quantities as heretofore, mass production of just a few kinds of cable can be attained. As a result, such advantageous effects as stableness in quality and ease of manufacture can be obtained. Additionally, the cables according to the present invention cannot only be used for connecting one piece of equipment with another, but also have advantages when used as service tools for service engineers to carry with them for testing and maintenance purposes.

DETAILED DESCRIPTION OF THE EMBODIMENT

Preferred embodiments of cables according to the present invention will be described with reference to the accompanying drawings.

Figure 1:
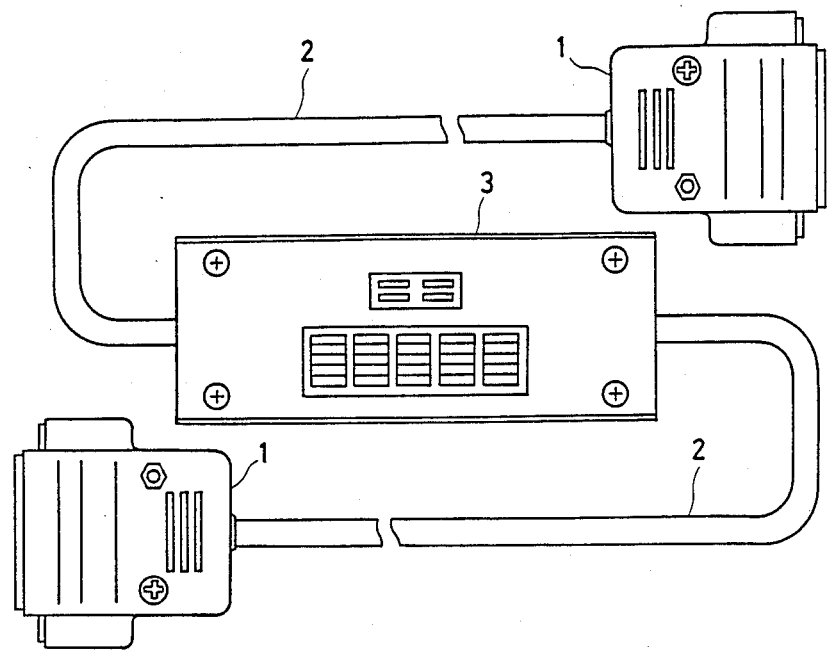
FIG. 1 shows an exemplary first embodiment of the present invention.
Figure 2:
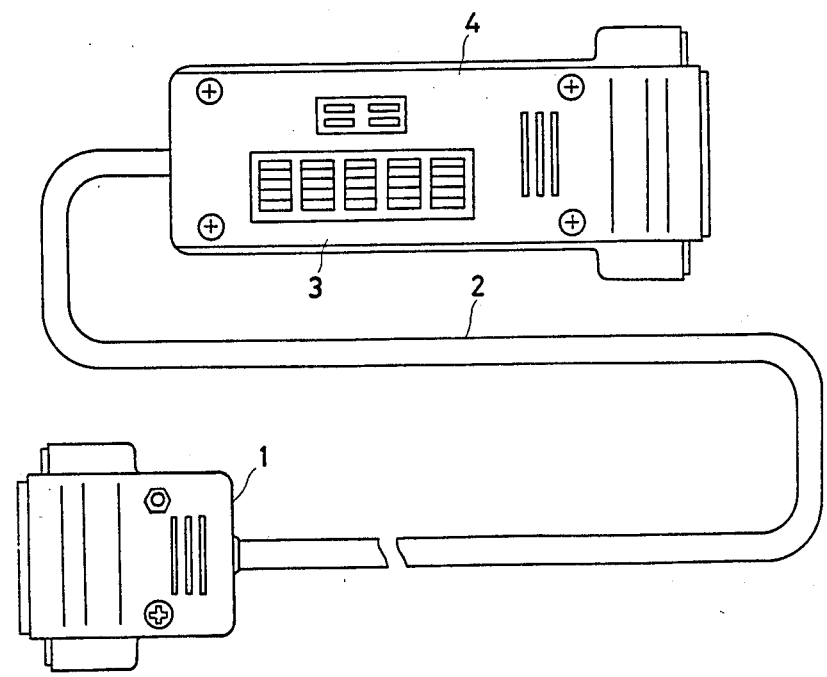
FIG. 2 is shows an exemplary second embodiment of the present invention.

As shown in FIGS. 1 and 2 an interface cable with a plurality of switches according to the first embodiment of the present invention comprises connectors 1, a cable 2 connected with said connectors 1 at both ends thereof, and a switch housing 3 located at a desired position of said cable 2. The switch housing 3 contains the plurality of switches. According to the second embodiment of the present invention, the cable includes at its one end a connector 4 formed of one of the connectors 1 and said switch housing 3, integrally constituted with respect to each other, and at its other end the other connector 1, the cable 2 connecting the connector 4 with the other connector 1.

Figure 3:
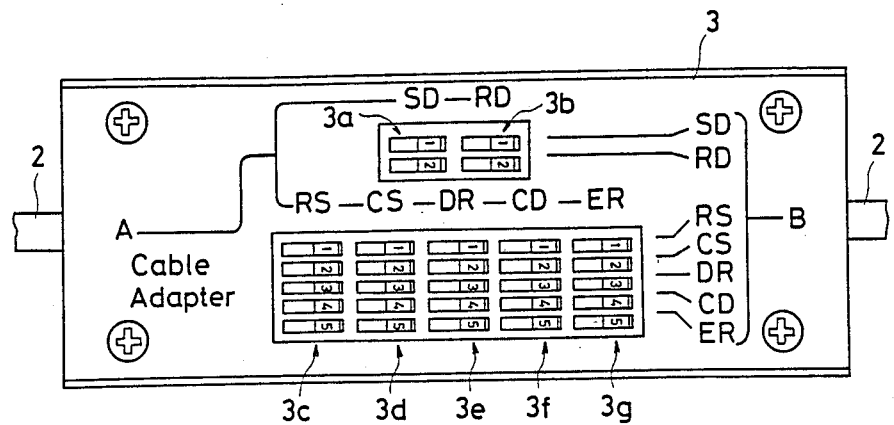
FIG. 3 is a front view of the switch housing according to an embodiment of the present invention.
Figure 4:
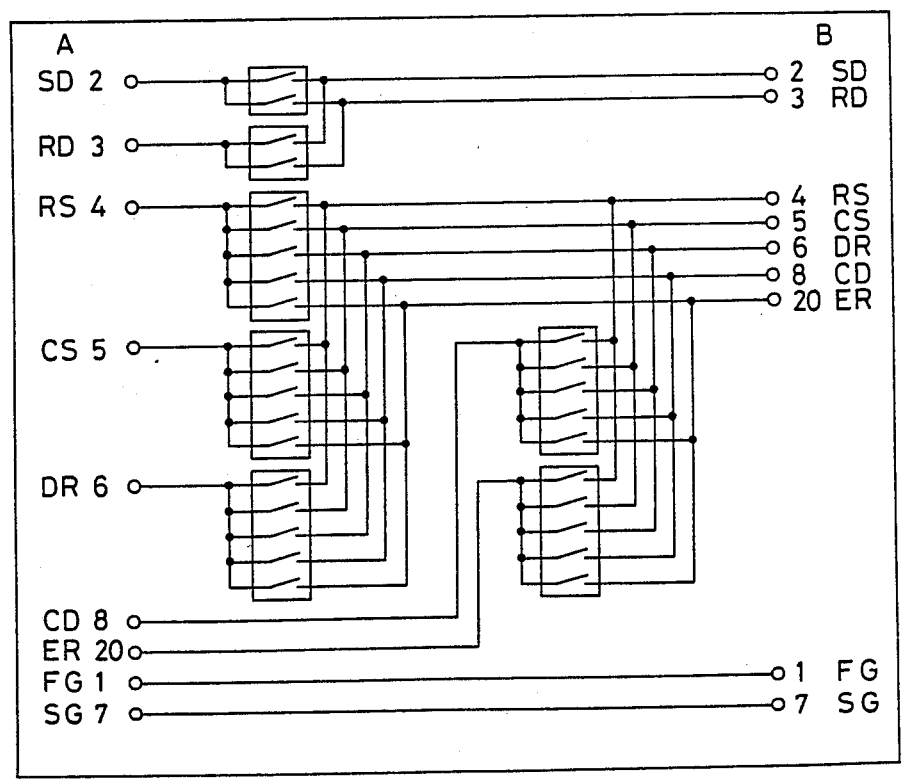
FIG. 4 is a schematic view showing the internal wiring of the switches according to an embodiment of the present invention.

The switch housing 3 contains two sets of changeover switches 3a and 3b for connecting the SD and RD lines, and five sets of changeover switches 3c, 3d, 3e, 3f and 3g for selectively connecting RS232C interface lines, RS, CS, DR, CD, and ER, as shown in FIGS. 3 and 4.

Figure 5:
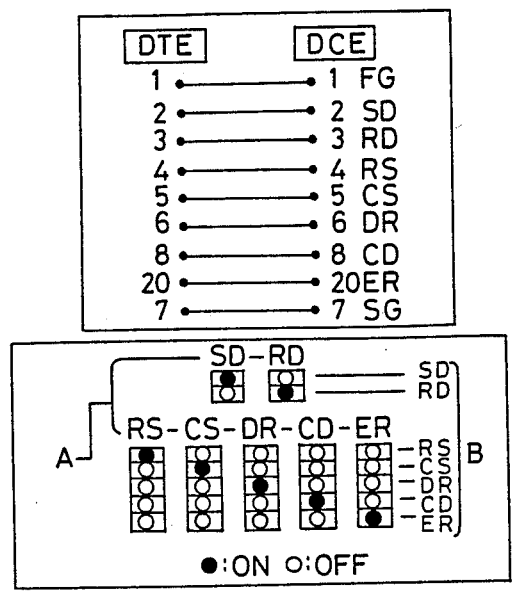
FIGS. 5 to 10 show examples of interconnecting schemes embodying the present invention.

Examples of typical connections of the interface cables according to the embodiment of the present invention, which are constituted in a manner as mentioned above, will be described. According to the scheme shown in FIG. 5, when switch 1 of the changeover switch 3a for the SD line, switch 2 of the changeover switch 3b for the RD line, switch 1 of the changeover switch 3c for the RS line, switch 2 of the changeover switch 3d for the CS line, switch 3 of the changeover switch 3a for the DR line, switch 4 of the changeover switch 3f for the CD line, and switch 5 of the changeover switch 3g for the ER line are "on", respectively, an interconnection circuit between the terminal equipment (DTE) and the modem equipment (DCE) of the standard RS232C type is obtained.

Figure 6:
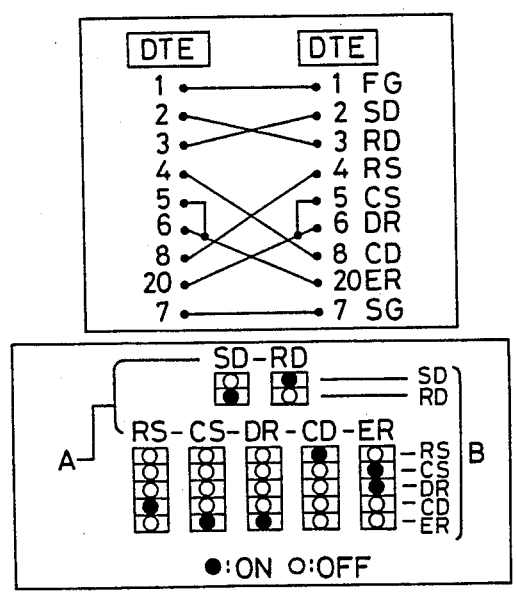
Figure 7:
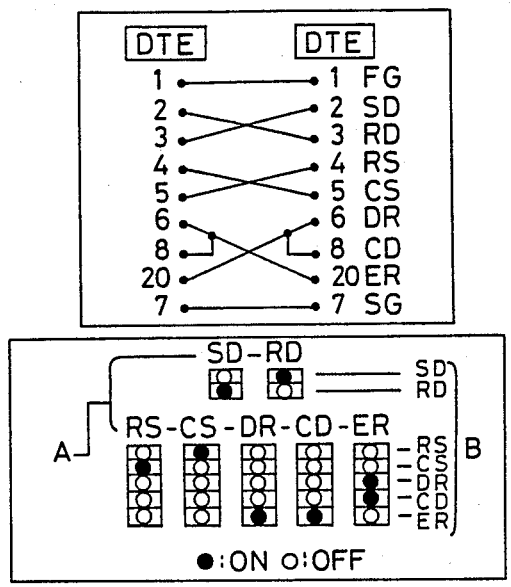
Figure 8:
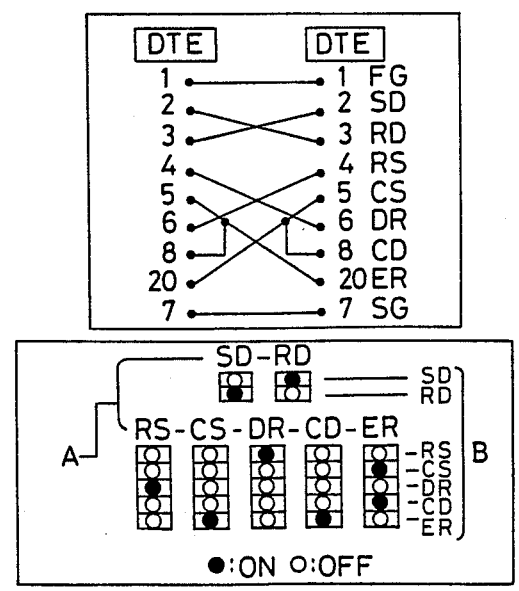

Also, interconnection schemes shown in FIGS. 6, 7 and 8 illustrate the interconnection schemes between a first piece of terminal equipment (DTE) and a second piece of terminal equipment (DTE), and interconnection between, for example, a personal computer and a printer, a plotter, a digitizer, etc.

Figure 9:
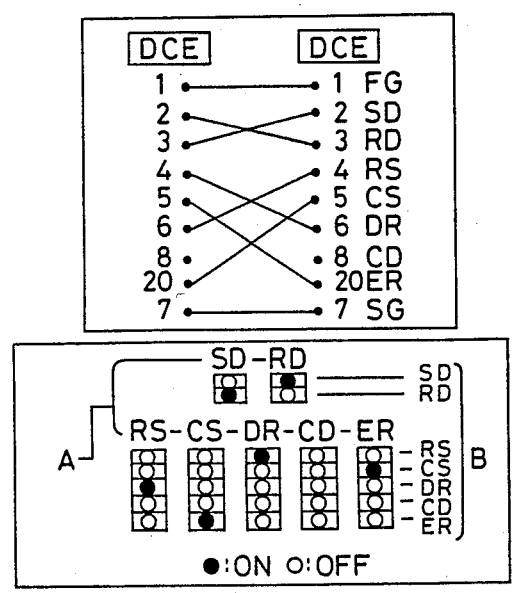
Figure 10:
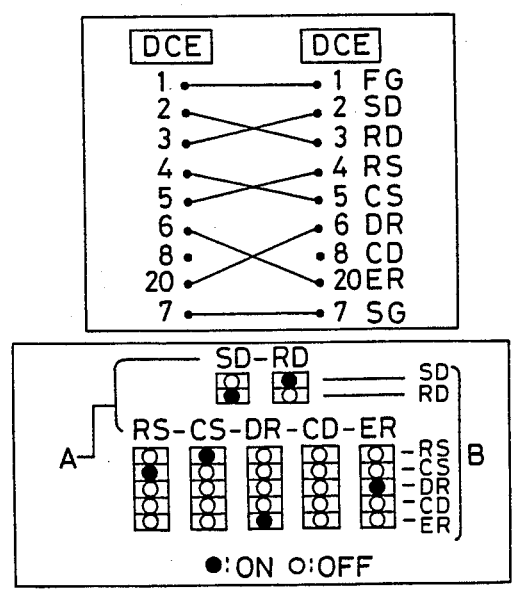

FIGS. 9 and 10 illustrate interconnection schemes between a modem (DCE) and another modem (DCE), and interconnection between for example, a personal computer having an RS232C port for a modem and a personal computer having an acoustic coupler, etc.

It should be understood that the above mentioned connections and various interconnection schemes are shown as examples, and other connection and interconnection schemes can be selectively obtained in accordance with the protocol of the equipment to be connected.

Also, it should be noted that in order to fully protect the state of the switch once set, each switch may be formed as a slide type, or alternatively, a cover may be arranged thereupon.

What is claimed is:

1. An interface cable comprising:
   a connecting cable having multiple lines;
   at least two RS232C connectors connected to opposite ends of said cable, said multiple lines of said cable establishing a connection pattern between said at least two RS232C connectors; and
   a plurality of changeover switches provided between said RS232C connectors for selectively changing said connection pattern with respect to at least a part of said multiple lines,
   wherein said plurality of changeover switches can interchange an SD (BA for EIS) line and an RD (BB for EIS) line with respect to each other and can selectively connect an RS (CA for EIS) line, a CS (CB for EIS) line, a DR (CC for EIS) line, a CD (CF for EIS) line and an ER (CD for EIS) line between the RS232C connectors.

* * * * *